April 3, 1928.
J. A. HOWARD
WINDSHIELD CLEANING DEVICE
Filed March 10, 1927
1,664,746
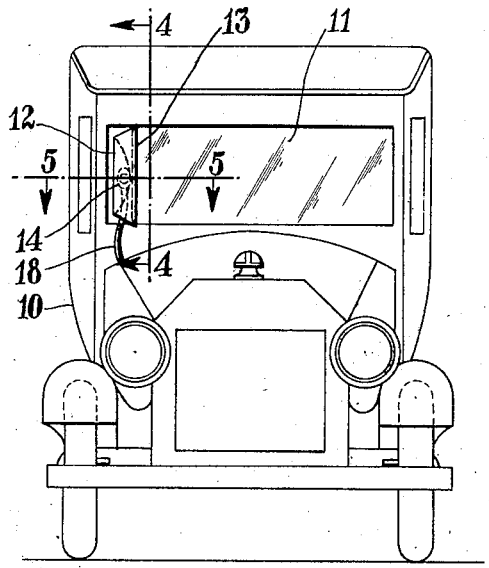
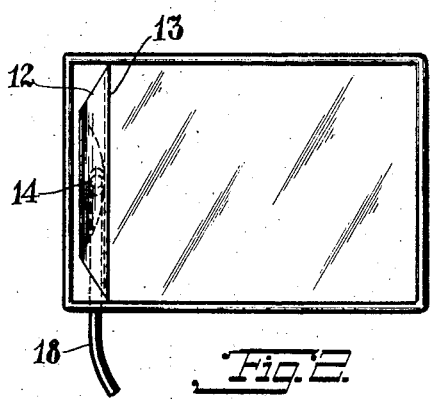
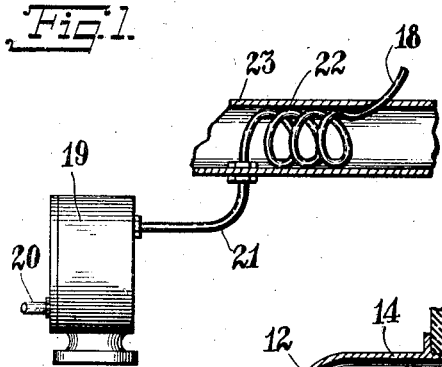
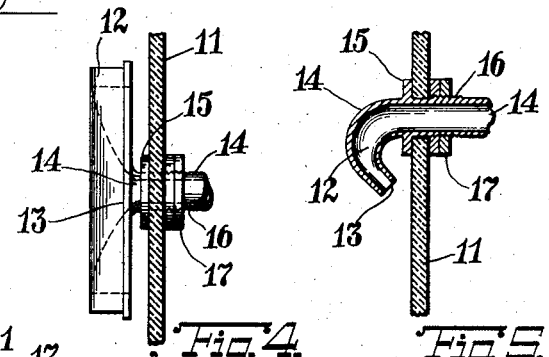
INVENTOR
John Alexander Howard
BY
ATTORNEY Patented Apr. 3, 1928.

1,664,746

UNITED STATES PATENT OFFICE.

JOHN ALEXANDER HOWARD, OF WEST BRIGHTON, NEW YORK.

WINDSHIELD-CLEANING DEVICE.

Application filed March 10, 1927. Serial No. 174,314.

This invention relates generally to means for providing clear vision through glass windows, and has more particular reference to a windshield or window cleaning device for vehicles, aeroplanes, locomotives, ships, etc.

The invention has for an object the provision of a novel windshield or window cleaning device which will prevent moisture, water, snow, or the like, from remaining on a window to which the device is attached.

The invention has for a further object the provision of a device for cleaning windshields or windows, which can be manufactured and sold at a reasonable cost, which can readily be installed, and which is very efficient in operation.

For further comprehension of the invention and of the objects thereof, reference will be had to the following description and accompanying drawings and to the appended claims in which the various novel features of the invention are more particularly set forth.

Referring to the accompanying drawing forming a material part of this disclosure:

Fig. 1 is a front view of a motor vehicle having the invention device applied thereto.

Fig. 2 is a front view of a window from a vehicle, or an aeroplane, or a ship, or the like, having the device applied thereto.

Fig. 3 is a schematic view of a means of obtaining heated air preferably usable in the device.

Fig. 4 is a fragmentary vertical sectional view, taken on the line 4—4 of Figure 1.

Fig. 5 is a fragmentary horizontal sectional view, taken on the line 5—5 of Figure 1.

Fig. 6 is a view similar to that shown in Figure 5, but disclosing a modification of the invention.

Fig. 7 is a vertical front sectional view showing another modification of my device.

Fig. 8 is a vertical sectional view of the same.

The reference numeral 10 indicates generally a motor vehicle, having a windshield 11 made of glass. The invention is not restricted to a motor vehicle's windshield, and may be applied wherever clear vision is needed through glass windows of pilot houses for observation to safely navigate vessels on the water, or in the air, or on land. For further illustration, the invention may be applied to steam or electric locomotives, above or below level automobiles, motor or steam cars, or for observation in the side, front, or rear windows of any conveyance to give both the operator and the passengers thereof a clear view and vision in weathers that becloud the glass or other windows used for observation with fog, rain, or snow. Figure 2 shows a window with the invention applied thereto.

A nozzle 12 of a flat long construction has an outlet 13, and tapers therefrom to the size of an inlet pipe 14 connected therewith. The pipe 14 is formed with a flange 15 and a threaded portion 16 and a pair of nuts 17 are engageable on the threaded portion to coact with the flange 15 to clamp the nozzle 12 near one edge of the windshield 11.

A flexible pipe 18 has one end connected to the pipe 14, and the other end leads to some supply of heated air, or unheated air. This supply may be drawn from the exhaust or from the cylinders of an engine, or from a compressor, and may be heated or unheated. Figure 3 shows a compressor 19 having an inlet 20, and an exhaust 21. The exhaust 21 is led through coils 22 in the hot exhaust pipe 23 of an engine, and the coils 22 terminate in the pipe 18, which connects to pipe 14 and the nozzle 12. The air blows over the surface of the windshield or glass which is proposed to be kept clear, and blows drops of moisture or rain or snow away from the surface. If heated air is used, the heat of the current of air keeps the glass and the adjacent atmosphere at such a temperature that any moisture or water collected on the glass will tend to quickly evaporate.

In Figure 6 a modification is shown, disclosing that the nozzle 12 may be provided with means for adjusting the direction of the current of air therefrom. A shutter 24 having telescopic members 25, is hingedly attached to an edge of the nozzle outlet 13, as at 26. An arm 27 projects from the shutter 24, and slidably engages a curved finger 28 projecting from the nozzle 12, so that, as the shutter 24 is swung about 26 as a pivot, for example to a position indicated by the dot-dash lines 29, the arm 27 merely slides to a different position on the curved finger. A set screw 30 threadedly engages through the end of the arm 27 and abuts the finger 28 so that these parts may be locked at any desired position. The shutter 24 and the parts 25 serve to direct the current of air from the nozzle.

In Figures 7 and 8 I have shown another modification disclosing an auxiliary windshield 11' made of strips or sections to prevent cracking of the glass, built in a frame 11ª which is secured in any convenient manner to the usual windshield 11. The heated air is supplied through flexible pipe 18 to a distributing outlet 18' from which the hot air blows over both sides of the auxiliary windshield 11'. This distributing outlet may also be provided with adjustable shutters on both sides such as shown in Figure 6 in order to direct the air current to heat both sides of the glass. By means of this arrangement, the glass may be heated either evenly on both sides or on the outerside where the evaporation of water on the glass is more necessary. The amount of air current may be greater and the inner surface of glass 11' heated sufficiently to prevent cracking of the glass.

While I have illustrated and described the preferred form, construction and arrangement of the several elements employed, it will be understood that the device is nevertheless, susceptible of considerable modification therein, and I therefore reserve the privilege of resorting to all such changes as may be fairly embodied within the spirit and scope of the invention as claimed.

Having thus described my invention, what I claim as new and desire to secure by United States Letters Patent is:

1. In a device of the class described, the combination with a window and window frame, of an auxiliary transparent member mounted on said window frame in front of said first mentioned window, a nozzle mounted over the upper edge portion of said auxiliary transparent member extending the entire length thereof and comprising side walls disposed downwardly substantially adjacent the front and rear surface of said auxiliary transparent member, and a conduit connected with said nozzle for supplying a draft of heated air thereto, said nozzle being adapted to distribute the heated air evenly throughout the entire length of said transparent member and on the front and rear sides thereof to prevent excessive expansion of one surface of said transparent member relative to the other.

2. In a device of the class described a window comprising a window frame having an extended base portion, an auxiliary transparent member mounted on said extended base disposed in advance of said window, a nozzle mounted on the upper edge portion of auxiliary transparent member comprising downwardly disposed sides and a continuous chamber extending from end to end of said auxiliary transparent member, said sides being adapted to direct a draft of heated air on both sides of said transparent member, and means communicatively connected with said chamber for supplying heated air thereto.

3. In a device of the class described, a window comprising a window frame having an extended base portion, an auxiliary transparent member mounted on said extended base disposed in advance of said window, and a nozzle mounted on the upper edge portion of said auxiliary transparent member adapted to direct a current of heated air on both sides of the latter.

In testimony whereof I have affixed my signature.

JOHN ALEXANDER HOWARD.